No. 761,972. Patented June 7, 1904.

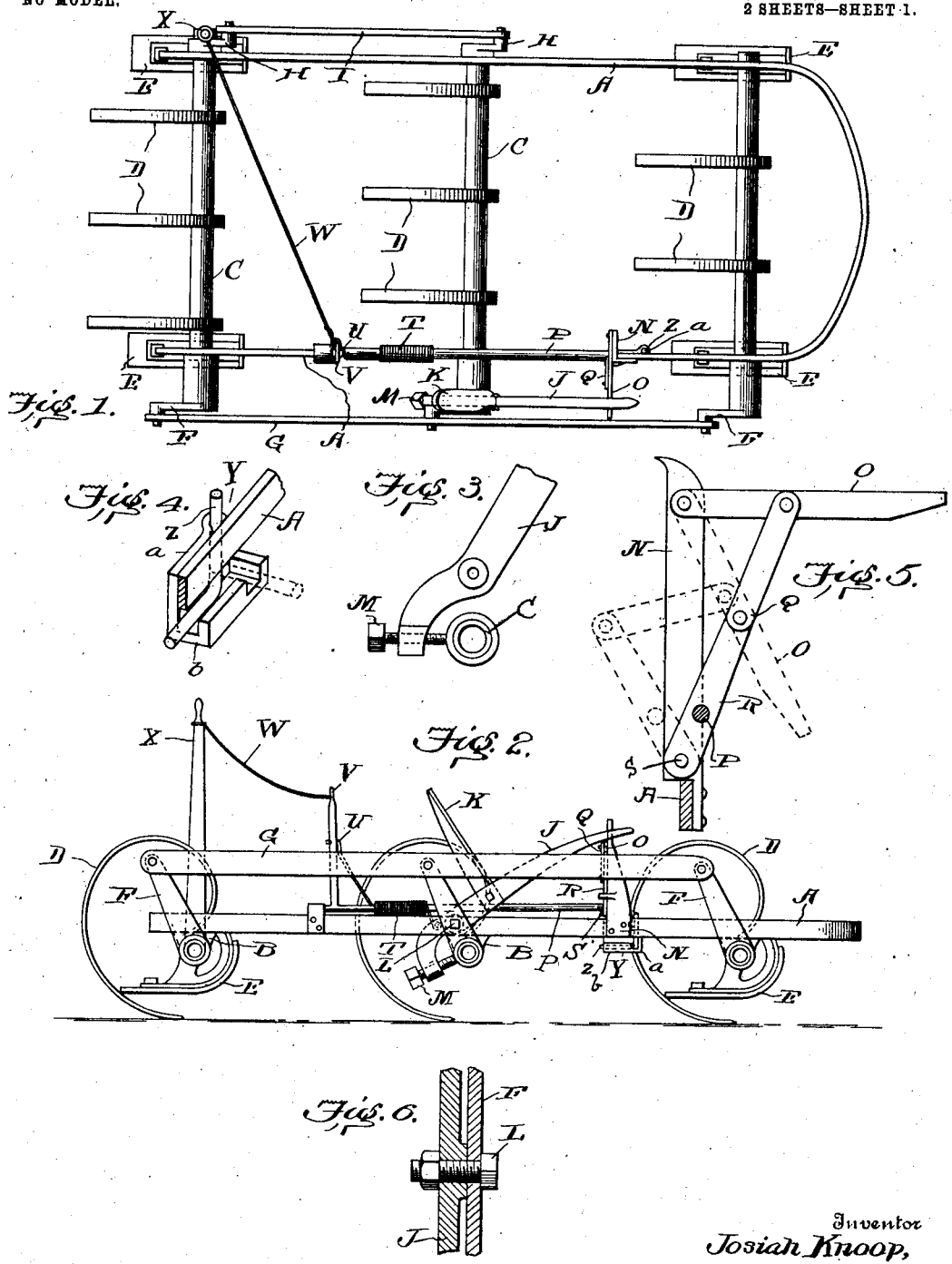

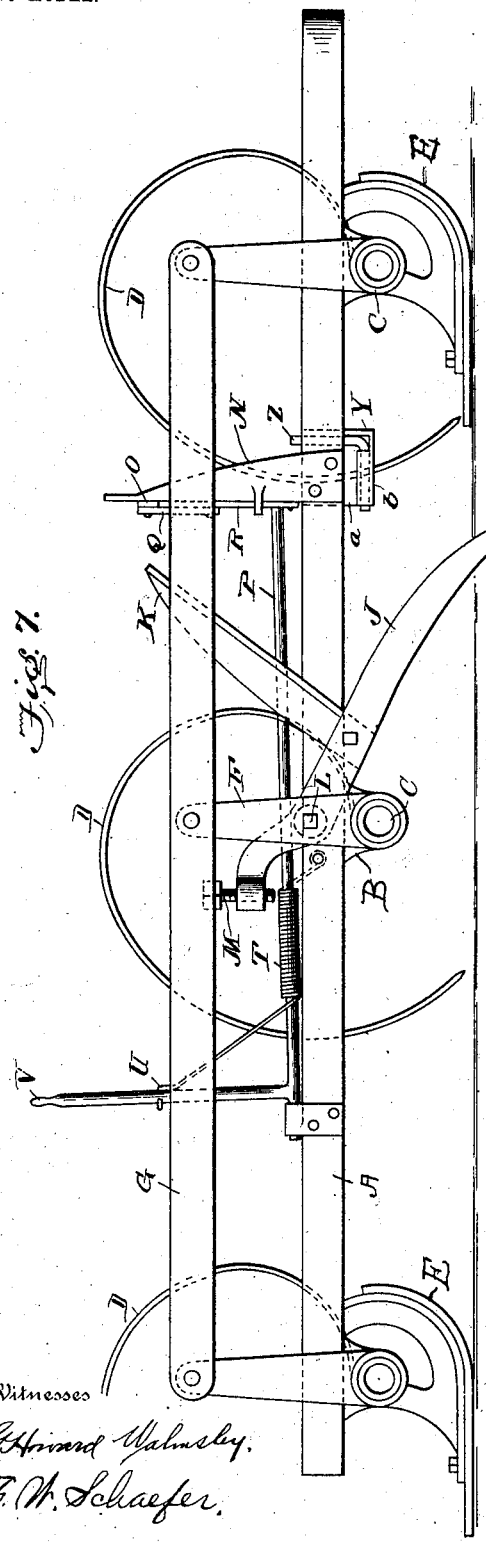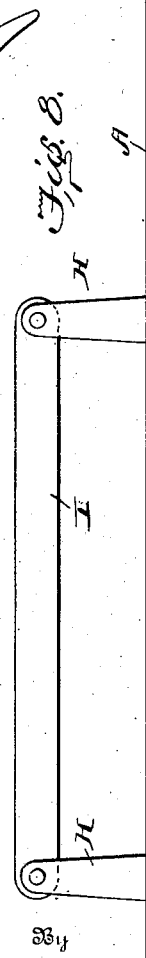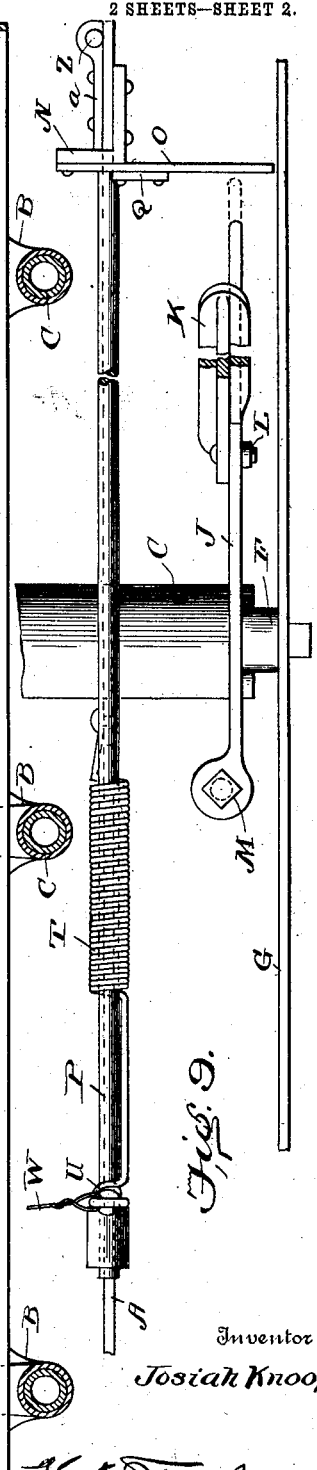

UNITED STATES PATENT OFFICE.

JOSIAH KNOOP, OF CASSTOWN, OHIO.

HARROW.

SPECIFICATION forming part of Letters Patent No. 761,972, dated June 7, 1904.

Application filed November 30, 1903. Serial No. 183,102. (No model.)

*To all whom it may concern:*

Be it known that I, JOSIAH KNOOP, a citizen of the United States, residing at Casstown, in the county of Miami and State of Ohio, have invented certain new and useful Improvements in Harrows, of which the following is a specification, reference being had therein to the accompanying drawings.

This invention relates to improvements in harrows of the type wherein the tooth-beams are partially rotated or adjusted to free the teeth they carry from the trash accumulated on the teeth; and the present invention is designed specially as an improvement upon the invention embraced in my Patent No. 612,112, dated October 11, 1898.

The object of the present invention is to provide a very effective throw-over device for throwing over the teeth by rotating the beams and an efficient trip mechanism for sustaining and releasing the throw-over device at the proper time, so that as the harrow is being dragged across a field and trash accumulates on its teeth the operator may easily actuate the trip devices and free the throw-over device, so that it will engage with the ground and throw over or revolve the teeth as the harrow still goes forward, the throw-over device acting also to return the teeth to normal position. The throw-over device and the trip mechanism also constitute the means for locking the tooth-beams against rotation during the operation of the harrow.

In the accompanying drawings, on which like reference-letters indicate corresponding parts, Figure 1 is a plan view of one harrow-section embodying my improvements; Fig. 2, a side elevation of the same with the throw-over device and the trip devices set to hold the harrow-teeth in working position; Fig. 3, an enlarged detail view of a part of the throw-over device and a cross-section of one of the tooth-beams, showing the adjusting means for regulating the normal position or angle of the throw-over device; Fig. 4, a detail partial sectional and partial perspective view of a stop device to support the throw-over device in a position to allow the teeth to clear the ground and the harrow to rest on the runners; Fig. 5, an enlarged rear elevation of the trip device for supporting the throw-over device in normal position, so that the teeth can engage with the ground; Fig. 6, a detail sectional view showing the manner of connecting the throw-over device with one of the crank-arms of one of the tooth-beams; Fig. 7, an enlarged side elevation of the harrow with the throw-over device just engaging the ground; Fig. 8, an enlarged side elevation of one of the side bars of the frame, of two crank-arms, and their pitman, showing the tooth-beams in cross-section; and Fig. 9, an enlarged plan view of a portion of the harrow, showing the trip device, the throw-over device, and part of one of the pitmen.

The letter A designates the side bars of the harrow-frame, constituting a section. In practice usually two sections are used, but as both are alike the illustration and description of one is deemed sufficient. This frame has mounted thereon in suitable bearings B rotatable tooth-beams C, carrying harrow-teeth D, preferably of convolute form and of the spring type. The frame is further mounted upon runners E, suitably secured to the frame and adapted to support the harrow when being dragged from place to place with the teeth elevated out of working position. These tooth-beams extend outside of the frame at one end and are provided with crank-arms F, to which is attached a pitman G, so that the tooth-beams all rotate together and are locked together. Two of the beams also have cranks H at their other ends, which are interconnected by a pitman I. The crank-arms H stand at an angle to the crank-arms F, so as to avoid a dead-center from occurring in this crank and pitman system. It will now be seen that if, say, the middle beam is given a rotary motion then all of the beams will likewise rotate, while if the middle beam is locked in one position the others will become locked in the same relative position.

The operation now to be performed is essentially twofold—first, the locking of the tooth-beams against rotation, so that the teeth will engage the soil and do their intended work, and, secondly, the rotating of the tooth-beams, so as to throw the teeth over and from the ground, whereby the trash which has accumulated on them may drag off and leave the teeth clear. These two functions are performed by my throw-over and trip devices. This throw-over device consists of an arm J, having a branch K, the arm being pivoted to one of the crank-arms F—say the middle one—by a bolt L, while the rear end of the arm carries an adjusting-screw M, adapted to impinge against the adjacent tooth-beam C when the machine is in ordinary operation, as shown in Fig. 2, in which position the throw-over device is locked by the trip devices presently to be described and being locked prevents the adjacent tooth-beam from rotating and likewise prevents the other tooth-beams from rotating, since the system of crank-arms and pitmen interconnects the several beams. By adjusting the screw M against the adjacent tooth-beam, as shown particularly in Fig. 3, the angle of the throw-over device may be varied, the adjustment serving to raise or lower the lower end of the throw-over device and the crank-arm F, so that the teeth may be set more or less in or out of the ground.

Referring to the trip devices, the letter N designates a standard secured to the frame A, as more particularly shown in Fig. 5, to which standard is pivoted a stop-finger O, connected to a rock-shaft P through toggle-links Q and R, the latter being pivoted on a stud S on the frame. When these toggle-links are in the position shown in Fig. 5—that is, when their centers are essentially in line—then the stop-finger O is held out in the path of the throw-over device, so as to support it. The rock-shaft is held in position to maintain this relation of the parts by a spring, preferably a spiral spring T, wound about it, with one end secured to the frame A and the other end at U to a lever or handle V, fixed on the rock-shaft, so that when the handle or lever is shifted laterally it will turn the rock-shaft and throw the parts to the position shown in Fig. 5, which will permit the throw-over device to drop down and engage with the ground, as shown in Fig. 7. Preferably a chain or cord W is attached to the handle or lever V at one end and at the other to a standard X, so that the operator in walking behind the harrow may easily reach forward and take hold of the chain or cord and by a pull throw the handle or lever V inward to withdraw the stop-finger O from the path of the throw-over device, which, as stated, then falls into engagement with the ground. By the time the harrow has proceeded far enough forward for the arm J to take well into the soil the arm will have struck the adjacent tooth-beam C, and thus become locked, as it were, so that the continued forward movement of the harrow will cause the throw-over device to revolve the adjacent beam C and its crank-arm F and through the pitman G and the other crank-arms to also revolve the other tooth-beams.

By the time the arm J is about to pull out of the soil or sufficiently before that point is reached the arm K becomes engaged with the ground and continues the action of revolving the tooth-beams and throwing the teeth forward to clear them of the accumulated trash, which is left on the ground as the teeth pull away from it. By this time the arm J will have passed sufficiently over the center of its pivot to fall forward and again catch on the stop-finger O. The teeth then settle back to raking position and as they again reëngage the soil become locked by the impingement of the throw-over device on the adjacent tooth-beam at one end, while supported at the other by the other stop-finger. This operation is repeated as often as it is desired to dislodge the accumulated trash and is purely automatic once the trip devices are actuated to free the throw-over device. The runners E of course support the harrow when the teeth are in trash-dislodging position and when the teeth are up and the harrow is being moved from place to place. To support the teeth in an elevated position for moving the harrow from place to place, the arm J of the throw-over device is allowed to drop down upon a catch Y, (shown more clearly in Fig. 4,) being an L-shaped bolt Z, mounted in a clip a, secured to the frame A. A projecting bracket b from the clip supports the catch either in the position shown in full lines in Fig. 4, when it is out of the path of the throw-over device, or in the position shown in dotted lines, when it extends across the path and will support the arm J. The catch Y is manipulated by hand when occasion requires.

Thus it will be seen that I have provided a throw-over device which performs three functions—that of holding the teeth in harrowing position, that of throwing the teeth forward or partially rotating them to clear them of trash, and that of holding the teeth out of position for moving the harrow from place to place—and have provided trip mechanism to hold or support the throw-over device and to free it as occasion requires and have also provided a catch device to support the throw-over device when the harrow is to be moved from place to place and is not in operation.

Having thus fully described my invention, what I claim as new, and desire to secure by Letters Patent, is—

1. In a harrow, the combination with a frame, rotatable tooth-beams carrying teeth, and interconnecting mechanism for the beams, of a pivoted throw-over device adapted to form a locked connection with the beams through suitable intermediate devices, and trip devices to sustain the throw-over device and to release it to allow it to descend in engagement with the ground to effect a partial rotation of the beams as the harrow advances forward.

2. In a harrow, the combination with the general frame, revoluble tooth-beams carrying teeth, and mechanism interconnecting said tooth-beams so that the rotation of one will carry the others, of a throw-over device pivoted to a part of the said interconnecting mechanism and adapted to assume a locking connection therewith, and trip devices to support the throw-over device when the teeth are in working position, and to release it to enable it to engage with the ground, for the purpose set forth.

3. In a harrow, the combination with the frame, the tooth-beams carrying teeth, and mechanism for interconnecting said beams, of a throw-over device pivoted to a part of said mechanism and adapted to engage with another part to form a locked connection therewith, the throw-over device being adapted to descend into engagement with the ground when released and to hold the teeth in working position when held, and trip devices standing normally in the path of the throw-over device and adapted by hand manipulation to withdraw from said path to release the throw-over device and allow it to engage with the soil.

4. In a harrow, the combination with the frame, and tooth-beams carrying teeth, the beams having crank-arms interconnected by a pitman, of a throw-over device comprising a main arm having a branch arm, and pivoted to one of the crank-arms and adapted to engage with the adjacent tooth-beam, and trip devices comprising a rock-shaft adapted to be operated by hand, a spring to maintain it in normal position, toggle-links operated by said rock-shaft and a pivoted stop-finger supported and operated in and out of the path of the throw-over device thereby.

5. In a harrow, the combination with the frame, and tooth-beams carrying teeth, and interconnecting mechanism for said beams, of a throw-over device having a pivotal and locking relation to the interconnecting mechanism, and a catch to support the throw-over device in a position to hold the teeth out of the ground.

6. In a harrow, the combination with the frame, the tooth-beams carrying teeth, and having crank-arms at one end of all of them and at the other end a plurality of them, and a pitman connecting the crank-arms of the respective ends to each other, the crank-arms at one end being at an angle to those at the other to prevent the occurrence of a dead-center in the rotation of the beams, of a throw-over device having a pivoted and locking relation to the said interconnecting devices so as to descend into engagement with the ground and to become locked to said mechanism, and trip devices to support and release the throw-over device.

7. In a harrow, a rotatable tooth-beam and a pivoted throw-over device, in combination, with devices for sustaining and releasing the throw-over device, whereby it may be held in normal position, allowed to descend to the ground, and after causing a partial rotation of the tooth-beams, is carried on its upward movement by the rotating portion of the harrow, to its normal position.

8. In a harrow, a throw-over device comprising a main pivoted arm having a branch arm, in combination with trip devices comprising a spring-held rock-shaft, toggle-links operated thereby and a stop-finger actuated by the links, whereby the throw-over device may be supported, released or arrested.

9. In a harrow, a main frame, tooth-beams carrying teeth, and interconnecting mechanism for said beams, of a throw-over device having a pivotal and locking relation with said interconnecting mechanism, trip devices to support and release the throw-over device, and an adjusting device operating between the throw-over device and a part of the harrow to adjust the position of the throw-over device and thereby cause it to lock with the interconnecting mechanism sooner or later to hold the harrow-teeth more or less deeply in the soil.

10. In a harrow, the main frame, the tooth-beams carrying teeth, and having interconnecting mechanism, of a throw-over device having a pivotal and locking relation with said interconnecting mechanism and a catch to sustain the throw-over device in position to hold the teeth out of action.

11. In a harrow, the combination with the frame, a tooth-beam having a crank-arm, a throw-over device pivoted to the crank-arm and adapted to engage with said tooth-beam when itself engaged with the ground, and trip devices to sustain and release the throw-over device.

12. In a harrow, the combination with a tooth-beam having a crank-arm, and a throw-over device comprising a main arm and a branch arm, the main arm being pivoted to the crank-arm and having at one end an adjusting-screw adapted to engage with said beam to adjust the relation of the main arm to the crank-arm, and trip devices to sustain and release the throw-over device.

In testimony whereof I affix my signature in presence of two witnesses.

JOSIAH KNOOP.

Witnesses:
LULU B. MICHAEL,
J. C. FULLERTON, Jr.